US010877954B2

(12) United States Patent
Bennett et al.

(10) Patent No.: US 10,877,954 B2
(45) Date of Patent: Dec. 29, 2020

(54) SYSTEM AND METHODS FOR SYNCING AND MERGING NETWORK CHANGES TO A DISTRIBUTION NETWORK

(71) Applicant: SCHNEIDER ELECTRIC USA INC., Andover, MA (US)

(72) Inventors: John Bennett, Garrett Park, MD (US); Kevin Abram Heater, Fort Collins, CO (US); Michael Louis Braun, Fort Collins, CO (US)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 328 days.

(21) Appl. No.: 15/398,670

(22) Filed: Jan. 4, 2017

(65) Prior Publication Data

US 2017/0193029 A1    Jul. 6, 2017

Related U.S. Application Data

(60) Provisional application No. 62/280,682, filed on Jan. 19, 2016, provisional application No. 62/275,105, (Continued)

(51) Int. Cl.
*G06F 16/23* (2019.01)
*G06F 16/80* (2019.01)
*G06F 30/18* (2020.01)
*G06F 30/13* (2020.01)
*G06F 113/14* (2020.01)
(Continued)

(52) U.S. Cl.
CPC ...... *G06F 16/2358* (2019.01); *G06F 16/2379* (2019.01); *G06F 16/80* (2019.01); *G06F 30/13* (2020.01); *G06F 30/18* (2020.01); *G06F 2113/14* (2020.01); *G06F 2113/16* (2020.01); *G06F 2119/06* (2020.01)

(58) Field of Classification Search
CPC .. G06F 16/2358; G06F 16/2379; G06F 16/80; G06F 17/5004; G06F 17/509; G06F 2217/34; G06F 2217/36; G06F 2217/78; G06F 30/18; G06F 30/13; G06F 2113/14; G06F 2113/16; G06F 2119/06
See application file for complete search history.

(56) References Cited

U.S. PATENT DOCUMENTS 6,643,669 B1 * 11/2003 Novak ................ G06F 16/275
7,054,799 B1    5/2006 Hartell et al.
(Continued)

OTHER PUBLICATIONS

Collins-Sussman et al., "Version Control with Subversion, for Subversion 1.7", 2011 (Year: 2011).*
(Continued)

*Primary Examiner* — Jay A Morrison
(74) *Attorney, Agent, or Firm* — Lando & Anastasi, LLP

(57) ABSTRACT

System and method for syncing and merging network changes to a distribution network are disclosed. In some embodiments, network changes made to a network outside of a Geographic Information System (GIS) can be synced to the GIS so that the GIS remains an enterprise's primary repository for network information. In some embodiments, the disclosed system enables comparing and merging of network states using a command-based technique that significantly reduces the number of possible merge conflicts.

19 Claims, 13 Drawing Sheets

Related U.S. Application Data filed on Jan. 5, 2016, provisional application No. 62/275,076, filed on Jan. 5, 2016.

(51) Int. Cl.
  *G06F 113/16* (2020.01)
  *G06F 119/06* (2020.01)

(56) References Cited

U.S. PATENT DOCUMENTS

| | | |
|---|---|---|
| 7,647,136 B2 | 1/2010 | McDowell |
| 2003/0033117 A1 | 2/2003 | Sage |
| 2004/0236620 A1 | 11/2004 | Chauhan et al. |
| 2007/0168923 A1 | 7/2007 | Connor et al. |
| 2008/0077368 A1 | 3/2008 | Nasle |
| 2008/0091742 A1 | 4/2008 | Marshall |
| 2008/0300834 A1 | 12/2008 | Wiemer et al. |
| 2010/0191774 A1 | 7/2010 | Mason, Jr. et al. |
| 2012/0022713 A1 | 1/2012 | Deaver, Sr. et al. |
| 2012/0066578 A1 | 3/2012 | Robin et al. |
| 2013/0179140 A1 | 7/2013 | Sharma |
| 2013/0211797 A1 | 8/2013 | Scolnicov et al. |
| 2015/0012148 A1 | 1/2015 | Bhageria, Jr. et al. |
| 2015/0180538 A1 | 6/2015 | Smith et al. |
| 2017/0195187 A1 | 7/2017 | Bennett et al. |
| 2017/0195188 A1 | 7/2017 | Bennett et al. |
| 2017/0206292 A1 | 7/2017 | Bennett et al. |

OTHER PUBLICATIONS

Lee, Jiyeong, "3D data model for representing topological relations of urban features," Proceedings of the 21st annual ESRI international user conference, San Diego, CA, USA, 2001. (Year: 2001).*

Lee, Jiyeong, "A spatial access-oriented implementation of a 3-D GIS topological data model for urban entities," GeoInformatica 8.3 (2004): 237-264. (Year: 2004).*

Hijazi et al., "IFC to CityGML transformation framework for geo-analysis: a water utility network case," 4th International Workshop on 3D Geo-Information, Nov. 4-5, 2009, Ghent, Belgium, 2009. (Year: 2009).*

Extended European Search Report from corresponding European Application No. 17150081.2 dated Jun. 26, 2017.

Ash, Jeff, et al. "Optimizing complex networks for resilience against cascading failure," Physica a: statistical mechanics and its applications 380 (2007): 673-683, (Year: 2007).

Dharchoudhury, Abhijit et al. "Design and analysis of power distribution networks in PowerPC™ microprocessors," Proceedings 1998 Design and Automation Conference, 35th DAC, (Cat. No. 98CH36175), IEEE, 1998, (Year: 1998).

Sharma, Mithun J. et al. "Analytic hierarchy process to assess and optimize distribution network," Applied Mathematics and Computation 202.1 (2008): 256-265, (Year: 2008).

Sherali, Hanif D. et al. "A global optimization approach to a water distribution network design problem," Journal of Global Optimization 11.2 (1997): 107-132, (Year: 1997).

Shimizu, Yoshiaki, and Hiroshi Kawamoto, "An implementation of parallel computing for hierarchical logistic network design optimization using PSO," Computer Aided Chemical Engineering, vol. 25, Elsevier, 2008. 605-610.

* cited by examiner

| ID | Adjacent IDs |
|---|---|
| 1 | 100 |
| 10 | 100, 101 |
| 20 | 101, 102, 103 |
| 40 | 400 |
| 41 | 301 |
| 42 | 302 |
| 50 | 102, 200, 201, 202 |
| 51 | 103, 300, 301, 302 |
| 60 | 200 |
| 61 | 201 |
| 62 | 202 |
| 100 | 1, 10 |
| 101 | 10, 20 |
| 102 | 20, 50 |
| 103 | 20, 51 |
| 200 | 50, 60 |
| 201 | 50, 61 |
| 202 | 50, 62 |
| 300 | 51, 40 |
| 301 | 51, 41 |
| 302 | 51, 42 |

| ID | Adjacent IDs | Source ID | Phases |
|---|---|---|---|
| 1 | 100 | 1 | ABC |
| 100 | 10 | 1 | ABC |
| 10 | 101 | 1 | ABC |
| 101 | 20 | 1 | ABC |
| 20 | 102 | 1 | ABC |
|  | 103 | 1 | B |
| 102 | 50 | 1 | ABC |
| 50 | 200 | 1 | ABC |
|  | 201 | 1 | ABC |
|  | 202 | 1 | ABC |
| 200 | 60 | 1 | ABC |
| 201 | 61 | 1 | ABC |
| 202 | 62 | 1 | ABC |
| 103 | 51 | 1 | B |
| 51 | 300 | 1 | B |
|  | 301 | 1 | B |
|  | 302 | 1 | B |
| 300 | 40 | 1 | B |
| 301 | 41 | 1 | B |
| 302 | 42 | 1 | B |

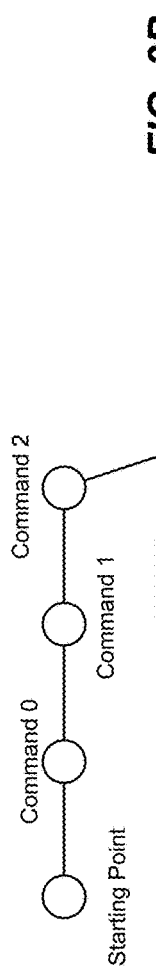
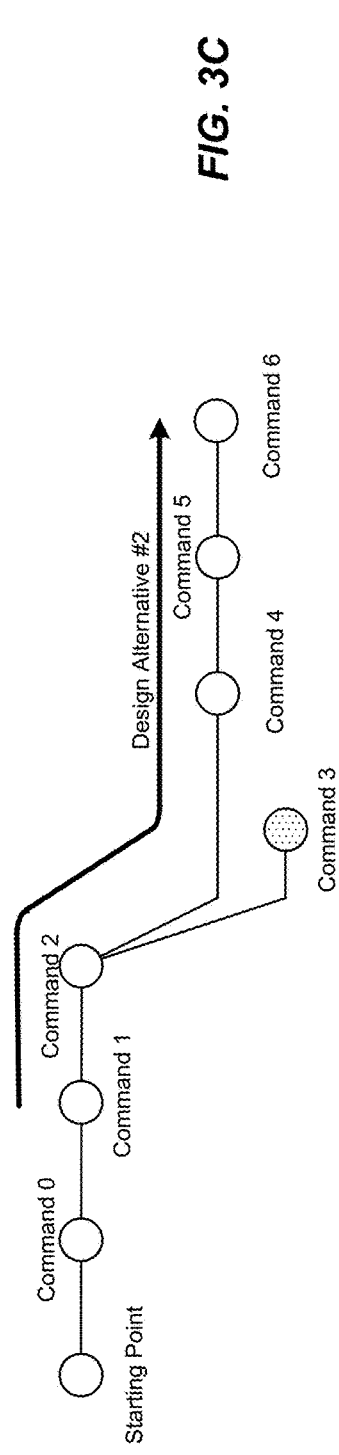
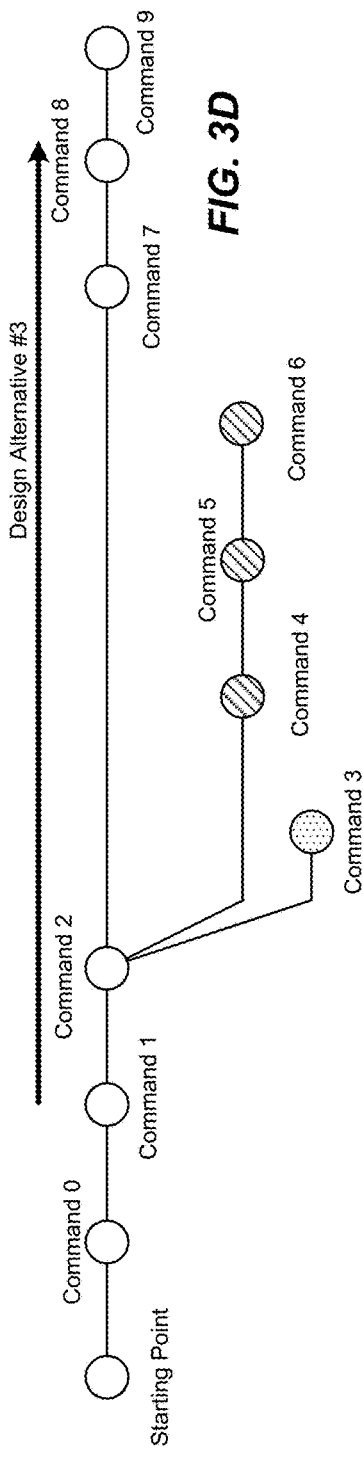
FIG. 3B
FIG. 3C
FIG. 3D

SYSTEM AND METHODS FOR SYNCING AND MERGING NETWORK CHANGES TO A DISTRIBUTION NETWORK

This application claims priority to and benefit from the following: U.S. Provisional U.S. Provisional Patent Application Ser. No. 62/275,076 titled "System and Methods for Creating a Geospatial Network Model in a Client Environment" filed on Jan. 5, 2016, U.S. Provisional Application Ser. No. 62/275,105 entitled "System and Method for Validating Network Configuration Changes in a Client Environment" and filed on Jan. 5, 2016, and U.S. Provisional Application Ser. No. 62/280,682 entitled "System and Methods for Synching and Merging Network Changes to a Distribution Network" filed on Jan. 19, 2016. Each of the aforementioned applications is incorporated herein by reference in its entirety.

BACKGROUND

Utility companies provide services such as electricity, gas, water, telecommunication, cable television, etc., to customers. All of these services require a distribution network for the area that is being serviced. As used herein, a distribution network comprises of pipelines, cables, and/or other equipment to facilitate distribution of a utility to customers. For example, an electrical distribution network comprising of cables/overhead lines and sub-stations facilitates distribution of electricity from a transmission/sub-transmission network to customers. Data representing the distribution facilities (e.g., poles, conductors, transformers, switching and protective equipment, etc., for electric distribution utilities) are stored in a facilities database, typically a relational database that includes geospatial attributes (i.e. a Geographic Information System, or GIS). Various software applications can then be used to perform editing, analysis and visualization of distribution networks. These applications typically work directly against the GIS database model, requiring execution of queries and calculations in the GIS which can result in performance issues (e.g., longer processing times and slow response). There are some engineering applications such as Milsoft and CymeDist that work outside of the GIS. However, these applications work with data exported from the GIS and are capable of performing only a specific set of engineering calculations. Moreover, as these applications are not integrated with the GIS network, network information in the GIS is not affected or influenced in any way as a result of editing or calculations performed in these applications.

BRIEF DESCRIPTION OF THE DRAWINGS

FIG. 2B is a graphical diagram illustrating an adjacency list for an undirected graph based on GIS feature data from a GIS database.

FIG. 2C is a graphical diagram illustrating an adjacency list for a directed graph created from the undirected graph in FIG. 2B.

FIG. 3B-D are diagrams illustrating command history branches in some embodiments of the disclosed system.

DETAILED DESCRIPTION

Figure 1A:
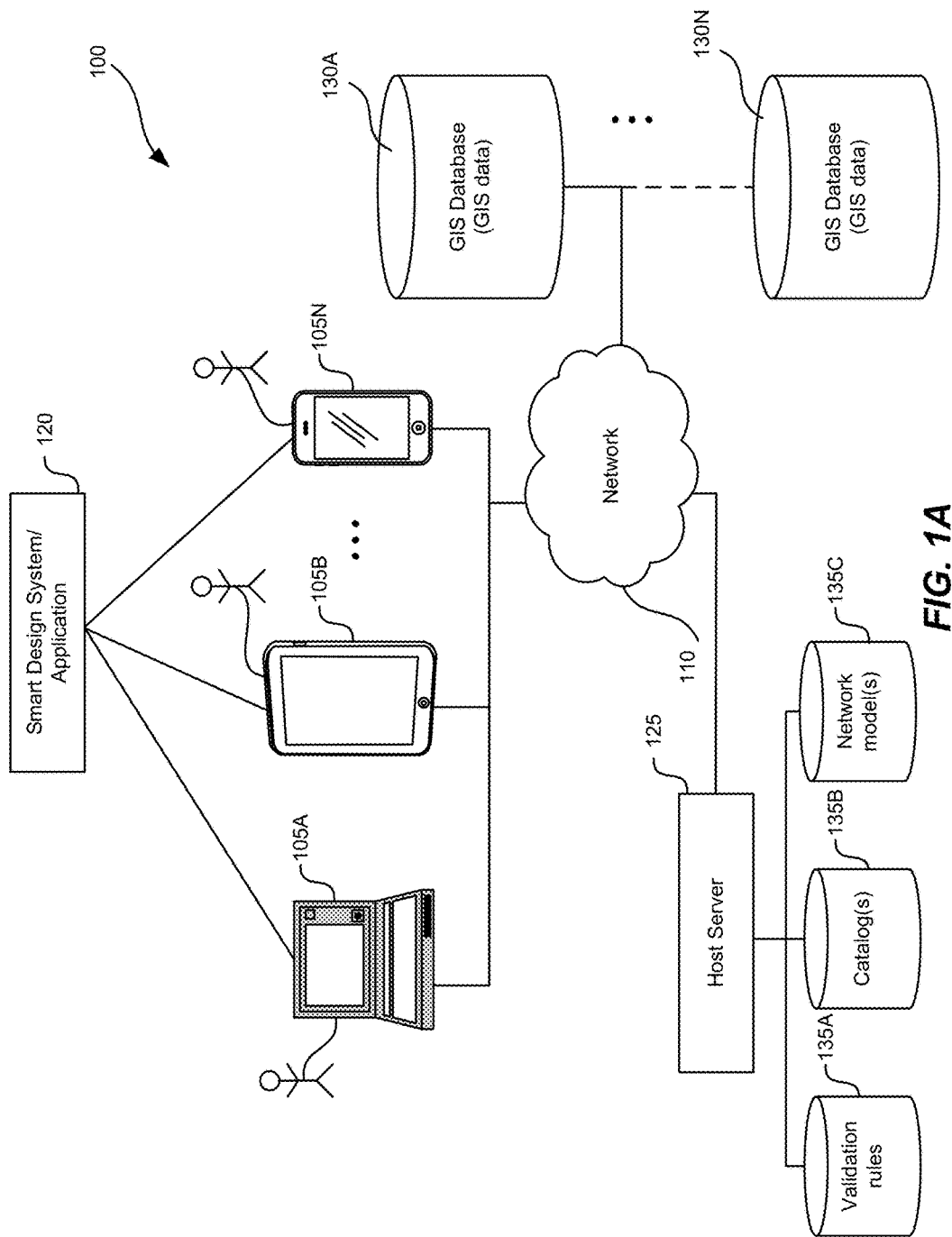
FIG. 1A is a block diagram illustrating an example environment in which a system and methods for syncing and merging network changes to a distribution network (hereinafter "disclosed system") can operate.

A system and methods for syncing and merging network changes to a distribution network are disclosed (hereinafter the "disclosed system"). In some embodiments, the disclosed system resides in a client device and provides a design environment that includes various features and functionalities for viewing, editing and/or analyzing a network design.

In some embodiments, the disclosed system tracks a sequence of updates or changes made to a distribution network ("network") design as a result of design changes to build a stack of network states, with each network state providing a snapshot of the network design at a point in time. The disclosed system can then leverage this stack to go back and forth between network states to undo or redo changes to the network design. The redo/undo functionality allows users of the design application to explore design alternatives in a fast and efficient manner without having to communicate with the GIS database. The redo/undo functionality also prevents a mistake in the network design from costing a user more time and effort and slowing down the design process.

In some embodiments, the disclosed system utilizes a command based design building technique to maintain for each network design a series of actions or steps (i.e., commands) required to get to a particular design state (i.e., state of a network design) rather than the result of those actions. The disclosed system can then use the commands that capture modifications to a network design to perform a command-based network merge that is better able to handle possible conflicts than data centric merge based on actual differences between the network designs. For example, consider a network extension design in a coaxial cable communication network that feeds a proposed office building. The network that was to supply the extension design is scheduled for an upgrade from an 862 MHz to a 1 GHz system. The existing network design may have a few components moved or swapped out. When the office building extension is ready to move forward, a merge of this design into the upgraded network needs to be performed. If only the data differences are considered, the merging can result in a number of conflicts that will require a designer's time and effort to rectify. Perhaps the design of the extension assumed an additional tap could be connected to the downstream port of an existing tap to supply the new building. The upgrade project may have required the cable along this stretch of the network to be replaced with a higher diameter cable and the taps swapped for a higher tap value. Merging using the creation, deletion, and modifications of entities and property values would throw a merge conflict stating that the assumed cable and tap to be re-connected into the new tap could not be found. This may be because the identifiers and properties of these entities would have changed during the upgrade. A designer could explain how the designs should be combined but that would be inefficient requiring a lot of time and effort from the designer to rectify each of the conflicts. In some cases, custom logic could be created to rectify this particular type of merge conflict by looking beyond the raw data, but the combinations and permutations of possible conflicts in merged designs could be staggering, making such custom logic overly complex. The disclosed system, in some embodiments, can capture the extension design in terms of commands expressing modifications to the network topology and perform a merge in a way that reduces or completely eliminates conflicts for many types of network changes. For example, the command to insert a tap may include information that a tap needs to be inserted on the first downstream port of the first component installed on the pole at a location near the office building location. Since the command describes the operation to be performed in terms of the network topology, the disclosed system can execute the command against the upgraded network to overcome the discrepancies in state with the original network.

In some embodiments, maintaining a stack of network states enables one or more operations to be performed within the bounds of a transaction. The disclosed system, in some embodiments, while holding a reference to an existing (immutable) network state, can execute a number of operations within the context of a transaction to create a new (immutable) network state. If an operation within the transaction cannot be completed or would create an invalid network state, the disclosed system can prevent the entire transaction from getting applied and potentially corrupting the design by holding constant the reference to the existing network state and not rolling forward to the new network state. From the view of the rest of the system, it would appear that the commands of the transaction were never executed. In some embodiments, this technique can be utilized when importing and merging networks to reduce the likelihood of conflicts.

In some embodiments, the disclosed system is capable of bidirectional synchronization (sync) with the GIS. For example, the disclosed system can fetch GIS feature data from the GIS, and transform the feature data into a network model that facilitates visualization, editing and/or analysis of the network. The creation of the network model in the client environment is described in detail in concurrently filed, co-pending U.S. application Ser. No. 15/398,611 entitled "System and Methods for Creating a Geospatial Network Model in a Client Environment", the entire content of which is incorporated herein by reference in its entirety. The disclosed system can also, in some embodiments, push network data (e.g., design work) back into the GIS. The disclosed system can thus complete the design life cycle by returning the design work back to the GIS which is typically the operational and asset management data source of an enterprise. In order to write the design information back to GIS, the disclosed system can use various techniques to interpret the design work, and reconcile and merge changes made within the design environment with the design work stored in the GIS. In some embodiments, the disclosed system can utilize the network model construct (NMC) architecture as described in the application referenced above in combination with command based design building technique described above to update the GIS with network data corresponding to network design changes.

In some embodiments, the disclosed system utilizes a novel design storage methodology to significantly reduce the memory and storage footprint of network information, which in turn enables efficient and rapid sharing of network designs with the GIS and/or any other devices and/or systems (e.g., with other client devices). The novel design storage methodology providing network data storage and transfer efficiencies includes replacing one or more branches of a network with one or more artificial nodes which stores relevant upstream or downstream information. The upstream/downstream information stored in the artificial nodes can then be used to derive relevant network information for calculations and/or analyses.

In some embodiments, the disclosed system enables disconnected network editing. For example, the disclosed system can enable a user to use the design application to make changes to a network configuration in field settings where connection to a communication network may not be available. The disconnected network editing is enabled by the NMC which delivers a local model to the design environment, thereby eliminating intensive data replication and queries to the GIS and waiting for responses back from the GIS. Automated syncing of design information and the novel design storage methodology further enables efficient and rapid syncing of the design once connectivity with the GIS is re-established.

In some embodiments, the disclosed system applies a technique of branching revision history to manage alternate designs for distribution network facilities captured as a sequence of commands that alter the state of the system under design. Each such design is typically the product of a significant amount of labor, and as such, by preserving these alternate designs, the disclosed system enables evaluations and comparisons of design alternatives and facilitates selection of a design alternative that best meets any given requirements.

These and various other embodiments of the disclosed system will now be described in detail.

FIG. 1A is a block diagram illustrating an example environment in which a system and method for communicating network information to a Geographic Information System (GIS) and/or other devices or systems (hereinafter "disclosed system") can operate.

As illustrated, the environment 100 comprises one or more client devices 105A-N (hereinafter client device 105), a communication network 110 and one or more GIS databases 130A-N (hereinafter GIS database 130). The client device 105 can be any hardware device that is able to establish a connection with another device or server, directly or via a communication network 110. Examples of a client device 105 include, but are not limited to: a desktop computer, a thin-client device, a mobile computing device such as a notebook, a laptop computer, a handheld computer, a mobile phone, a smart phone, a tablet, a phablet, and/or the like. The client device 105 typically includes one or more input/output devices to facilitate user interaction (e.g., to display a map, to enable a user to make a selection of an area on the map). In some embodiments, the disclosed system can be embodied in a smart network design application 120 (hereinafter "design application 120") which is installed in the client device 105. The design application 120 can be downloaded from a server (e.g., host server 125, an application store or a repository) and installed on the client device 105. In some embodiments, the design application 120 can be a web-based application that can be accessed via a web-browser. In some embodiments, the web-based application can operate by utilizing data stored in the browser's local storage (i.e., network model data remains in the client device but the data may be periodically backed up in the host server or a cloud). Various components or modules of the disclosed system are described in detail in reference to FIG. 2.

The GIS database 130 is a database or file structure that stores objects defined in a geometric space. One example of a GIS database is a geodatabase. Typically, each utility maintains its own GIS database. For example, a gas company can have its own GIS database that stores feature data for its gas distribution network. Similarly, an electric company can have its own GIS database that stores feature data for its electric distribution network. The GIS database 130 typically supports query execution on stored data as well as manipulation of the stored data. Examples of data stored in the GIS database include, but are not limited to: geometry or shape data and attributes of objects, typically grouped into different feature classes. The GIS database 130 may be implemented in Microsoft SQL Server, PostgreSQL relational database management systems, Microsoft Access, Oracle, IBM DB2, IBM Informix, and/or the like.

In some embodiments, the environment 100 includes a host server 125. The host server 125 can provide access to validation rules 135A, catalog(s) 135B, and/or network model data 135C. These data can be stored in one or more databases or database tables. The validation rules 135A can include rules to ensure that a network design meets certain requirements and/or standards. Typically, validation rules are specific to a distribution network. For example, in a gas distribution network, an applicable validation rule may be the diameter of a gas valve must match the diameter of the pipe to which the valve is snapped. By way of another example, in an electric distribution network, an example validation rule may be that the rated kVA of a transformer bank must be sufficient to handle the expected peak power demand of the customers connected to the transformer. The validations rules can be configured and extended to meet the specific requirements of a user designing a network or an enterprise/organization. The catalogs 135B can store components and design configurations that a user can use to design a network. The network models 135C can store various representations of network components and topologies associated with network designs. The network models are generally created client-side, and can be uploaded to the host server periodically or on demand for back up or for reuse.

The communication network 110, over which the client devices 105, the one or more GIS databases 130 and the host server 125 can communicate may be a telephonic network, an open network, such as the Internet, or a private network, such as an intranet and/or the extranet. The communication network 110 can be any collection of distinct communication networks operating wholly or partially in conjunction to provide connectivity to the client devices 105 and the GIS databases 130 and may appear as one or more communication networks to the serviced systems and devices. In some embodiments, communications can be achieved by a secure communications protocol, such as secure sockets layer (SSL), or transport layer security (TLS).

In addition, communications can be achieved via one or more wireless networks, such as, but not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 4G-LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 105 can be coupled to the communication network 110 (e.g., Internet) via a dial up connection, a digital subscriber loop (DSL, ADSL), cable modem, and/or other types of connection. Thus, the client devices 105 can communicate with remote servers (e.g., host server 125, GIS database 130, mail server, instant messaging server), some of which may provide access to user interfaces of the World Wide Web via a web browser, for example.

Figure 1B:
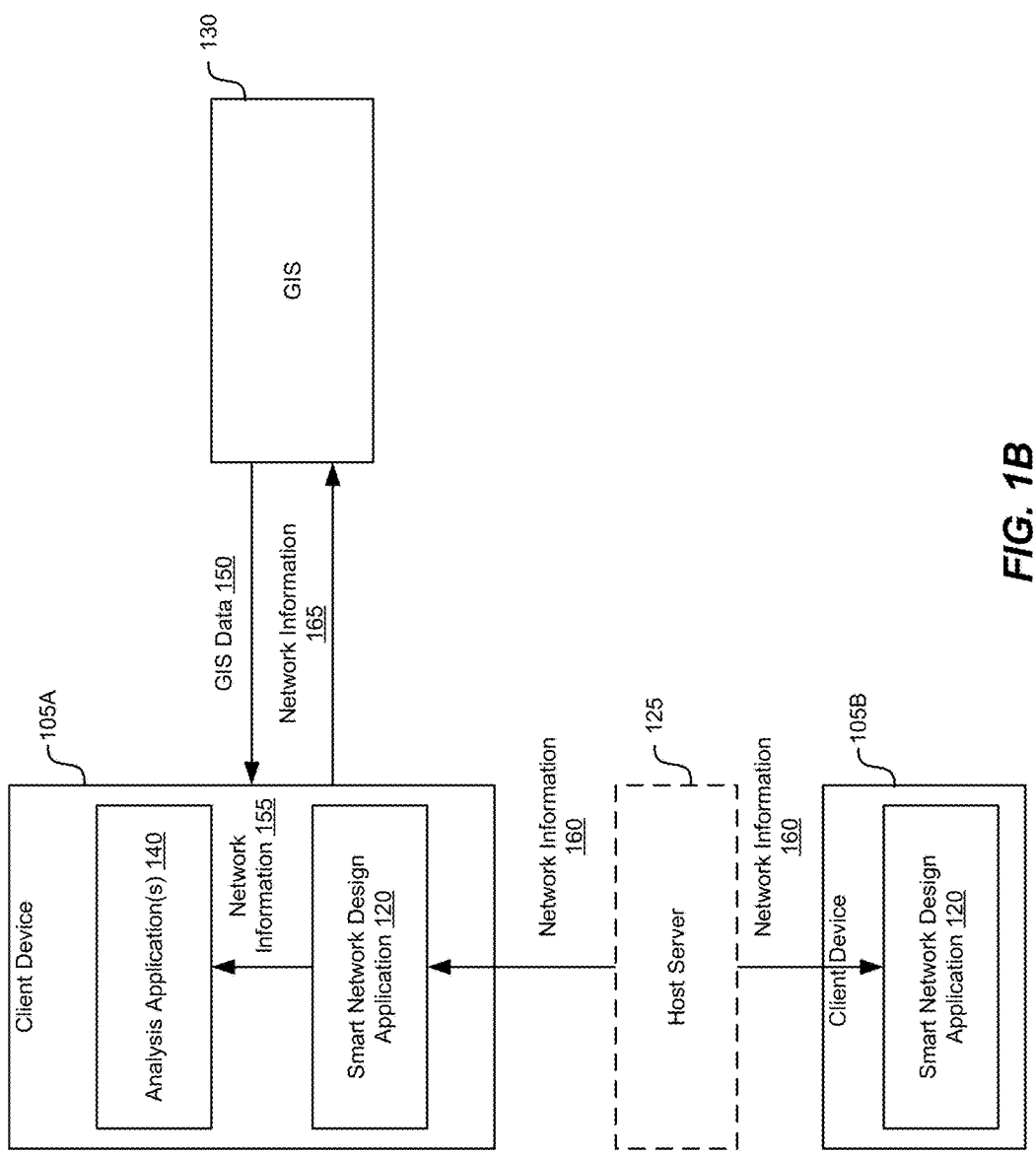
FIG. 1B is a block diagram illustrating example pathways in which network information can flow between client devices and between a client device and the GIS in accordance with some embodiments of the disclosed system.

FIG. 1B is a block diagram illustrating flow of network information between client devices, and between a client device and the GIS in accordance with some embodiments of the disclosed system.

The disclosed system, in some embodiments, can update the GIS 130 with network information so that changes made to a network design outside of the GIS 130 can be applied to or reconciled with the network design in the GIS 130. Syncing network design changes with the GIS 130 enables the GIS 130 to remain the primary repository for network designs. Consider, for example, a user who utilizes a design application 120 executing on a client device 105A to make changes to a network design. The disclosed system typically utilizes a local model for the network generated from GIS data 150 obtained from the GIS 130 to enable the user to make changes to the network design. The disclosed system records the edit operations performed by the user in the form of commands, which decouple the intent of the operations from the targets of those operations. Once edits to the network have been completed, the design application 120 determines the difference between the state of the network as it was loaded from the GIS 130 and the state of the network after all the commands were applied. The difference constitutes the updates 165 made to the network outside of the GIS 130, which is transferred by the design application 120 to the GIS 130 utilizing an API, for example. In some embodiments, the updates 165 can be formatted or otherwise manipulated to conform to a schema that is easily ingestible by the GIS 130.

In some embodiments, the disclosed system can communicate network information to other client devices and/or systems. For example, the design application 120 executing in a client device 105A can share a network design with the design application 120 executing on a client device 105B, directly or through a host server 125. The communication of the network information 160 between the client devices (or between a client device and a host server) can be performed efficiently and rapidly by using a hypernode construct to encapsulate network information from a portion of a network that was not modified or referenced in an artificial node, which reduces the amount of data to be stored and/or shared.

In some embodiments, the disclosed system enables a network design to be sent from the design application 120 directly to an analysis application 140 executing on the client device 105A to run simulations, advanced engineering calculations, and/or the like that may be beyond the scope of the design application 120. In existing systems, users can import network designs into an analysis application 140 from the GIS 130 only after performing a rigorous data validation in the GIS. However, the data validation still does not guarantee acceptance of the network design by the analysis application. The disclosed system on the other hand can bypass the GIS 130 and enable network designs to be sent from the design application 120 directly to the analysis application 140 without the use of intermediate files (i.e., spreadsheets, comma delimited text file, etc.) which may require additional validation steps to ensure compatibility with the analysis application before analysis can be performed. Utilizing the data directly from the design application 120 eliminates the need for this additional validation as the validation rules within the design application are sufficient to ensure proper operation of the analysis application. Tighter integration between the design application 120 and other applications such as the analysis application 140 also has the advantage of enabling advanced analyses to be performed at design time, which can speed up the design process.

Figure 2A:
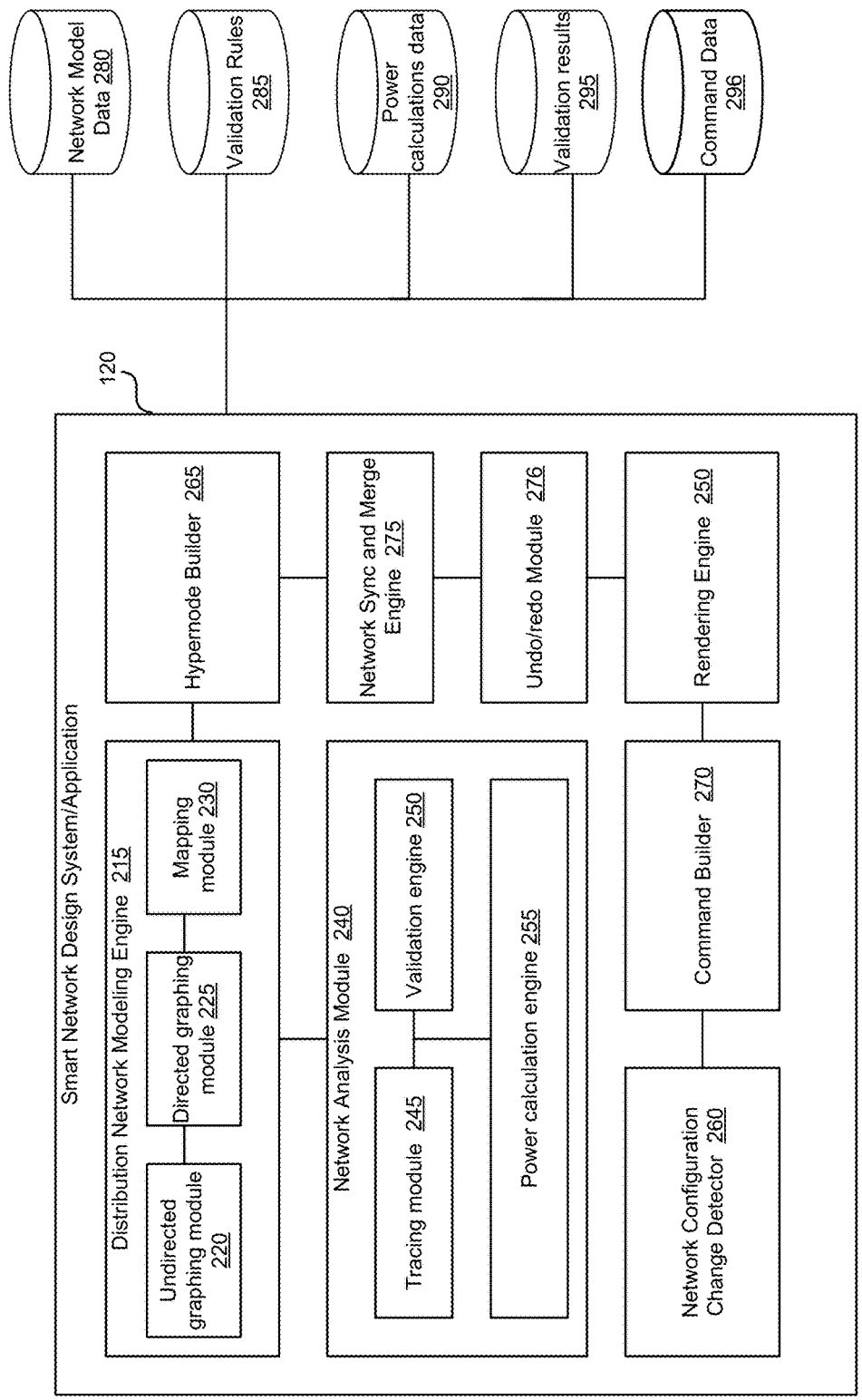
FIG. 2A is a block diagram illustrating example components of the disclosed system in some embodiments.

FIG. 2A is a block diagram illustrating example components of the disclosed system in accordance with some embodiments.

In some embodiments, the disclosed system resides in a client device (e.g., client device 105) and comprises a distribution network model engine 215 having an undirected graphing module 220, a directed graphing module 225 and a mapping module 230, a network analysis module 240 having a tracing module 245, a validation engine 250, and a power calculation engine 255, a rendering engine 250, a network configuration change detector 260, a command builder 270, a hypernode builder 265, and a network sync and merge engine 275. Various embodiments of the disclosed system may include more or less components. Similarly, in various embodiments, one or more components can be consolidated together into a single component. In some embodiments, various data utilized or generated by the disclosed system can be stored locally (e.g., cache memory) in the client device. Examples of data stored in the local storage can include network model data 280, validation rules 285, power calculation data 290, validation results 295 and command data 296, among others.

In some embodiments, the distribution network model engine 215 generates the network model that supports various operations such as visualization, analysis (e.g., tracing, load flow analysis, operating voltage calculations) and/or editing on a network. The network model engine 215, via the undirected graphing module 220, the directed graphing module 225 and/or the mapping module 230, can transform GIS feature data obtained from a GIS database (e.g., GIS database 130 described in reference to FIG. 1A) into a specialized data structure that can be utilized by the network analysis module 240 to perform various network analyses on the network. For example, the network model can be used by the tracing module 245 to determine for any given vertex in the network (e.g., corresponding to a selection made by a user on a map), the set of all vertices that are upstream and/or downstream of that vertex, with regard to the direction of flow of the network commodity (e.g., electric power, water, gas, electromagnetic signal, and/or the like). The rendering engine 250 can then render all the features that are upstream of the vertex and all the features that are downstream of the vertex in distinct styles (e.g., by using different coloring schemes or highlighting) to clearly illustrate, for example, the flow path of respective electrical phases through the features starting from the source vertex.

In some embodiments, the undirected graphing module 220 utilizes the geometric information in the GIS feature data to construct an undirected graph. As used herein, an undirected graph or an undirected network is a set of adjacency relationships between objects. An adjacency relationship between objects is represented by a commutative pair of object IDs. Suppose one of the endpoints of PrimaryConductor 101 coincides with the location of Switch 10. The undirected graphing module 220 recognizes this connection or adjacency between PrimaryConductor 101 and Switch 10 and in response creates an adjacency relationship between those objects, represented by an ordered pair of object IDs: (101, 10). Since it is an undirected graph, the adjacency relationship is commutative, so the undirected graphing module 220 also creates a complementary ordered pair (10, 101). Once the adjacency relationships between objects have been determined, the undirected graphical module 220 generates an adjacency list or data structure representing the undirected graph. An example of the adjacency list representing an undirected graph constructed from a set of GIS feature data is depicted in FIG. 2B. As illustrated, the adjacency list 276 includes a collection of object IDs and adjacent object IDs. In other words, the adjacency list 276 associates each object in the undirected graph with a set of neighboring objects. For example, object ID 1 is associated with its neighbor object ID 100, and object ID 100 is associated with its neighbors which include object ID 1, as well as object ID 10. In alternative embodiments, a GIS database can be the source of the adjacency list or data structure representing the undirected graph.

The directed graphing module 225 operates on the undirected graph, performing a series of traversals of the undirected graph, beginning at each object that is the source vertex to construct a directed graph. As used herein, a directed graph or a directed network is a set of objects having adjacency relationships, where all the adjacency relationships are directed from one object to another. When traversing the undirected graph, the directed graphing module 225 pays attention to selected attributes of certain objects that are of interest to the application domain. In the domain of electric power distribution, for example, the directed graphing module 225 examines the PhaseDesignation attribute of conductor vertices in the graph and to the ClosedPhases attribute of vertices representing sectionalizing devices. The directed graphing module 225 then uses these attributes to determine, at each step in the traversal, which of the electrical phases that reach a vertex via a given adjacency can be permitted to continue on to the other adjacencies of the vertex. For example, a switch which is open on all three phases blocks all phases, and thus a traversal halts upon reaching any open switch. By way of another example, if a traversal brings phases ABC up to a switch that is closed on phases BC but open on phase A, then only phases B and C will be allowed to pass on to the conductor on the far side of the switch. In other words, each time a traversal reaches a vertex $V_2$ coming from an adjacent vertex $V_1$, the directed graphing module 225 creates, in a new graph, a directed edge ($V_1$, $V_2$) that carries two additional attributes: SourceID and Phases. The SourceID attribute identifies the source vertex from which the traversal began. The SourceID attribute, in some embodiments, effectively serves as an identifier for the entire distribution circuit that is energized by that source. The Phases attribute indicates which electric phases reach all the way from that source to vertex $V_2$, arriving via vertex $V_1$.

The directed graphing module 225 performs a traversal of an undirected graph to output an adjacency list for the directed graph as illustrated in FIG. 2C. The adjacency list 278 for the directed graph includes a set of directed adjacencies with corresponding Source and Phases attributes. The data structure 278 readily supports a tracing operation, i.e., enumerates, for any given vertex in the graph, the set of all vertices that are downstream of that vertex, and all the vertices that are upstream of that vertex. For example, from the data structure it is apparent that vertices 50 and 51 are downstream of vertex 10. The data structure 278 can also support other flavors of network analyses.

The mapping module 230, in some embodiments, manipulates the adjacency list representing the directed graph to optimize the look up performance for network analysis (e.g., tracing or any other operations or analyses), so that the look up performance does not become progressively worse as the size and complexity of a distribution circuit increases. In some embodiments, the mapping module 230 achieves the optimization by renumbering the objects in the directed graph so that the adjacency list for the directed graph can be stored in the form of an array where the array index serves as a proxy for the object's original ID as known to the GIS. Indexing the array in this manner enables random access to the adjacencies for any given vertex in the network, so that the lookup complexity for adjacencies is O(1). The mapping module 230 creates a mapping of GIS IDs to array indexes in the network model, and vice versa, so that the start object for a tracing action can be converted into the corresponding array index, and the trace results, which are developed as a set of array index values to represent the traced objects, can be converted into GIS IDs for those objects. In some embodiments, the adjacency list for the directed graph can be stored in the form of hashtables. In other embodiments, the mapping module 230 may be optional.

In some embodiments, the specialized data structure representing the network generated by the network modeling engine 215 is stored in a local storage 280 (e.g., cache memory). When a user selects an object on a map to see the tracing results, the tracing module 245 accesses the network model data 280 to look up objects that are upstream and/or downstream of the object. Because of the caching of the network model data, there is no need to start from the GIS feature data or data representing the undirected graph and traverse the undirected graph again. Instead the module 225 will have already performed the traversal of the undirected graph once to create the directed graph and in some embodiments, the mapping module 230 will have already converted the data structure for the directed graph into an array or hashtable format and stored the array or hashtable in the local storage 280. This means that in addition to the upstream and downstream orientations, electrical phases and information about the power source are precalculated and can be quickly recalled from the cache memory for tracing operations or to respond to attribute queries on any object in the circuit. For example, a user can select any object on a circuit, the network analysis module 240 can access the network model data 280 to recall information such as the power source for that object and the phases that reach the object from the power source and instantly display the results on the map, without performing additional calculations or network operations (e.g., communicating with a server over a communication network).

In some embodiments, the structure of the output from the mapping module 230, i.e., a directed graph streamlined for electric circuit tracing in both upstream and downstream directions and other network analyses, can be fully represented in an object oriented programming language using two classes: one class to represent the directed edges with their attributes, and the network class itself that includes the network objects, the adjacencies between the objects (i.e., the directed edges), and the mapping of network object IDs to array index values.

In some embodiments, the adjacency list representing the undirected graph (generated by the undirected graphing module 220 or received from the GIS database 130) can support at least some of the operations relating to visualization, network analysis (e.g., tracing, load flow analysis, operating voltage calculations), validation and/or editing on a distribution network. As such, the adjacency list representing the undirected graph can be stored locally on the client device (e.g., in a cache memory 280) in its original form, or in a form (e.g., array, hashtable) optimized for lookup speed (e.g., via the mapping module 230).

In some embodiments, the network configuration change detector 260 can detect changes to the configuration of a network. Network configuration changes that the network change detector 260 can detect can include, but are not limited to: changes in network topology (e.g., adding, deleting, moving, and/or swapping components or features) and changes in component configuration (e.g., changing diameter of a pipe, changing kVA rating of a transformer). The network change detector 260 can notify the network analysis module 240 and/or the rendering engine 250 when any network configuration changes are detected.

In some embodiments, the network analysis module 240, via its components, can perform various network analyses on distribution networks. In some embodiments, the validation engine 250 listens for network configuration changes as a user builds out a network (e.g., via network configuration change detector 260) to inspect the network for invalid network configurations that do not meet requirements and/or standards specified by validation rules 285 that are stored locally. The validation rules can target specific issues such as insufficient signal strength and powering overcurrent and undervoltage, depending on the type of distribution network. The validation rules can be configured and extended to target the specific requirements of a user and/or organization.

By way of example, consider a Radio Frequency (RF) network design. One way to validate the RF network design is to traverse the network from its signal source to all downstream components. The network traversal requires many iterations over the adjacency list. Starting with the signal source vertex, one approach to performing this traversal is to read the adjacent (downstream) components, push the non-visited, adjacent vertex identifiers onto a stack, pop the next vertex identifier off this stack, perform the necessary operations with the current vertex, push the adjacent vertices onto the stack, and continue this loop until no items remain on the stack to visit.

Some network configuration changes have far reaching impacts on various aspects of the network. For example, in the case of a RF network design, network configuration changes can impact RF signals and component powering. While some network evaluation optimizations may be possible, most network changes to topology or component configuration can involve the validation engine 250 evaluating all components on a leg off a node or even the entirety of the network connected to a common node against RF network validation rules. In some embodiments, the validation engine 250, via the power calculation engine 255, can reevaluate all powering rules on the common power network fed by a power supply in the event any change impacting network topology or internal powering configuration is detected (e.g., by the network configuration change detector 260).

Before validation of component powering can be performed, the power calculation engine 255 can calculate the voltage and current through each component of the RF network. In some instances, to resolve these values the portion of the network powered by a power supply can be determined. While power delivered to the active components of an RF network is delivered along the same cables providing the RF signals to and from the optical node, the power network does not typically have the same topology as the RF network. The powering network for a component may span multiple node boundaries through the use of power inserters and coax cable that bridge networks to reduce the number of power supplies necessary to drive a Hybrid fiber-coax (HFC) network. Likewise, a single RF network may have sections powered by power supplies bridged from other node boundaries. The power calculation engine 255 can calculate the current and voltages through components by determining the logical, hierarchical powering network fed by a power source. The determination can include locating a power supply and using the RF network graph (e.g., directed graph) to determine the components connected to this power supply. Further traversal downstream from a component can mean deeper inspection of a component's internal configuration by the power calculation engine 255 to determine which ports can supply power and which have had an internal fuse pulled thereby blocking power through a port. Once the power network has been determined, the power supply specs can be referenced to find the operating voltage of the power supply. The entire power network can be set at this operating voltage and then an iterative algorithm can be used to evaluate the current draw and resultant voltage in and out of each component until the total current draw residual at the power supply is within a predefined margin. For cables, the voltage drop can be determined by the cable length, resistance per length, and current draw through the cable. Active components use switching power supplies to pull a relatively constant power—as input voltage drops the current draw will increase. This current to voltage profile can be defined within the catalog specification for a given active component. These properties for cables and active components can be used in each step of the iterative algorithm. After voltages and current draws are calculated they are held by the power calculation engine 255 in an immutable data structure (e.g., as power calculations data 290 in a local storage) and may be looked up by the validation engine 250 to evaluate against the power validation rules to ensure the voltage input into active components is at or above minimum requirements and total current passing through any component is below the component's operating amperage rating. In some embodiments, the power calculation data can also be accessed by the rendering engine 250 for feedback in the user interface (UI) of the disclosed system.

In the case of an electric distribution circuit, when load is added downstream of a component, that load can augment the load on all the conductors upstream of the component all the way back to the circuit source. In some embodiments, the power calculation engine 255 can perform a load flow analysis to determine the amount of current flowing through the conductors. Based on the calculated current and applicable validation rules, the validation engine 250 can determine if any of the conductors are too small in size. The validation engine 250 can then provide feedback indicating that the conductors are carrying too much load. Similarly, adding load anywhere on the feeder can bring voltages down almost everywhere on the feeder. The validation engine 250 and the power calculation engine 255 can together determine if the additional load causes the voltage at the component to drop below a minimum threshold, typically set by the utilities.

The validation engine 250 can store the results from the validation for notification and/or other purposes. In some embodiments, the validation engine 250 can capture each violation in a validation result object to provide a user-friendly message about the issue, severity, and information about the components in violation. The collection of validation result objects can be used to provide a list of issues to be addressed in the design. In some embodiments, the violations can be presented in the geographic and schematic views of the network (e.g., rendered by the rendering engine 250). The validation results 295 can be stored locally in some embodiments.

In some embodiments, the disclosed system allows real-time analysis and calculations to be performed on a network design even as the network design is being modified. This functionality is enabled by the distribution network modeling engine 215 that creates new data structures to represent the states of the network as modifications are made to a network design. For example, consider a network design that is being edited by a user. The current state of the network design is represented by a data structure, but the state of the network design after the modification is represented by a new data structure. With this approach, one thread can traverse the network to perform a network analysis, while another thread can perform a component swap on that same network to create a new data structure without changing the state of the network that the first thread is referencing. The multi-threaded approach utilized by the disclosed system improves the application performance, making it real-time or near real-time.

In some embodiments, the new data structure is generated by transforming the old data structure in such a way that the new data structure comprises of vertices that changed and reference points to vertices that did not change. By creating the new data structures to include reference points to the old data structure, the disclosed system can reduce the memory cost of storing and tracking the various states of a network design. Moreover, by taking into account the information that typically changes as a group, one group can be separated from another to reduce the number of new data structures that need to be instantiated during the lifetime of the network design. The memory savings described herein can be achieved using Microsoft .NET's Immutable Collections library in some embodiments. The network analysis module and validation of network designs is described in detail in concurrently filed, co-pending U.S. application Ser. No. 15/398,654, entitled "System and Method for Validating Network Configuration Changes in a Client Environment," the entire content of which is incorporated herein by reference in its entirety.

In some embodiments, the command builder 270 can receive information about one or more operations performed on a network design to change its configuration from the network configuration change detector 260. The command builder 270 can then build a command from the one or more operations to modify the network, encapsulating necessary information to perform the one or more operations, so that the command can be executed at a later point in time or against a different version of the network with the same effect. The command builder 270 can record the commands corresponding to operations performed on the network to modify the network or change the configuration of components in the network (i.e., network operations) serially in a data file in some embodiments. For example, the commands can be serialized in an XML, JSON or another suitable file or format. The command data 296 can be stored locally on the client device.

In some embodiments, the set of data structures representing the various states of a network as modifications are made to the design of the network, and the sequence in which those data structures are created can be tracked and utilized by the network modeling engine 215 to build a stack of snapshots of the network. Each snapshot of the network can thus provide information about the configuration of the network at a particular point in time. Using this stack, the undo/redo module 276 can execute "undo" and "redo" commands to switch between network states.

The hypernode builder 265 represents a branch of a network truncated by an extraction area as a single node to store network information more efficiently. In the electrical domain, such a branch may include network assets that are not going to be modified or referenced as part of editing work in the extracted area, but may include feeder information that may be needed for deriving feeder properties such as phase load for network analysis. Thus the hypernode can store relevant upstream information efficiently, which can improve application performance and also facilitate faster sharing of network information with other client devices and/or systems.

In some embodiments, the network sync and merge engine 275 can synchronize ("sync") updates made to a network design outside of the GIS 130 (e.g., in the design environment of the design application 120 executing on a client device 105) to the GIS 130. The network sync and merge engine 275 can access a first state of the network as it was loaded from the GIS 130 from a local storage on the client device. The first state of the network thus corresponds to the state of the network in the GIS 130. The network sync and merge engine 275 can also access a second state of the network from the local storage on the client device. The second state of the network can be the state of the network resulting from operations performed on the network. The network sync and merge engine 275 can then compare the second state of the network to the first state of the network to determine updates to the networks. In some embodiments, the network sync and merge engine 275 can transform the updates into a data structure that is easily ingestible by the GIS 130 (e.g., by applying a pre-defined schema). The network sync and merge engine 275 can then send the updates to the network to the GIS 130 to update the current state of the network in the GIS to a new state so that the new state is synced to the state of the network in the client device.

In some embodiments, the network sync and merge engine 275 can also merge two or more network designs into a single design. For example, the network sync and merge engine 275 can reconcile changes made to the same area or different areas of the network at different locations (e.g., different devices), or at different points in time based on commands. The command builder 270 can transform operations performed to modify topology of a network into a set of commands. The network sync and merge engine 275 can then execute the set of commands or a subset thereof against another network to merge the two networks. The network sync and merge engine 275 can also compare network designs and automatically resolve conflicts that may arise from the merging in some instances.

In some embodiments, the network model data 280, power calculations data 290, validation results 295, command data 296 and/or other application data stored locally on the client device can be periodically uploaded to the host server 125 and/or another cloud repository for back up or other purposes. In some embodiments, all operations performed on a network design can be performed within the context of a workspace. As such, in some embodiments, the disclosed system can instantiate multiple workspaces to allow multiple network designs to be open (e.g., for viewing, editing, etc.) at the same time.

Figure 3A:
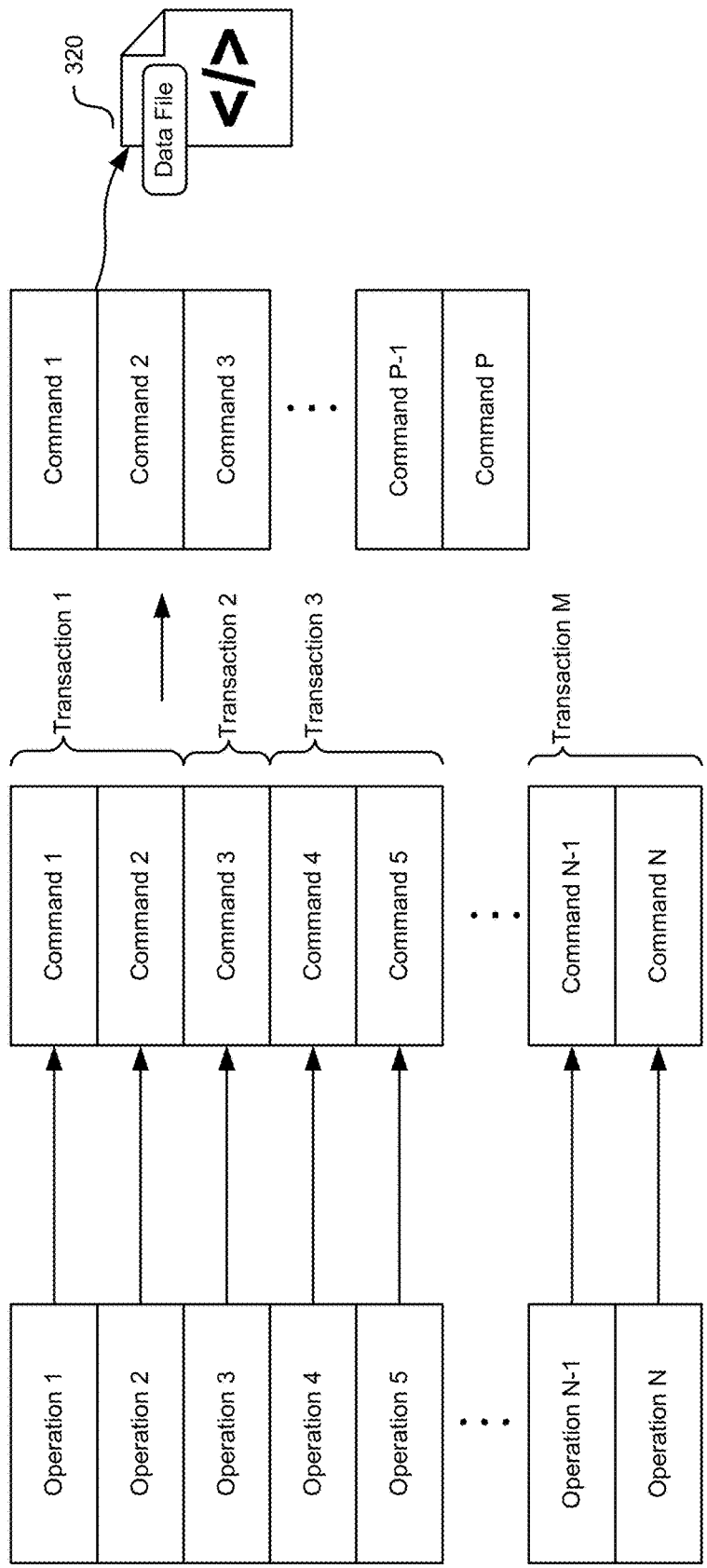
FIG. 3A is a block diagram illustrating command building and tracking in some embodiments of the disclosed system.

FIG. 3A is a block diagram illustrating command building in some embodiments of the disclosed system. In some embodiments, any operation to modify a network or component configurations can be performed as part of a command. As disclosed above, a command encapsulates the necessary information to perform an operation on a network so that the operation can be executed at a later point in time or on a network having a different state. A command thus decouples the intent of an operation from the target of that operation. Referring to FIG. 3A, a user performs operations 1-N on a network. The disclosed system captures these operations as commands 1-N. In some embodiments, some of the commands can be consolidated or combined to create a composite command. So, the disclosed system can reduce the commands 1-N to commands 1-P, where N is greater than P. This technique reduces the complexity of individual commands while permitting greater reuse of a single command. Moreover, rich behavior can be achieved by aggregating several basic commands together. The original set of commands 1-N or the reduced set of commands 1-P can then be stored in a serialized fashion in a data file 320 (e.g., in a file using a structured data format such as XML, JSON).

By way of an example, consider a scenario where a designer updates a network design by adding a transformer, a conductor and a service point. The disclosed system (e.g., via the command builder 270) translates these changes into a sequence of commands: command 1: create a transformer with certain properties, command 2: create a conductor with a set of spatial properties and attributes, and command 3: create a service point which can be stored in a serialized fashion in a data file using a structured data format (e.g., data file 320). The disclosed system (e.g., via the sync and merge engine 275) can detect commands 1-3 as updates made to the network design and transmit one or more data packets including these commands to the GIS 130 to request the GIS to update its content. An example of such an update message to the GIS 130 formatted using JSON (JavaScript Object Notation) and encapsulating a command for creating a conductor having a set of properties and attributes can be as follows:

```
{
    "id": 19,
    "adds": [{
        "geometry": {
            "paths": [[
                [-9168447.1440486275, 3460855.09226354],
                [-9168407.3288516812, 3460872.1559193744]]],
            "spatialReference": {
                "wkid": 102100,
                "latestWkid": 3857
            }
        },
        "attributes": {
            "NEUTRALSPECID": "{1E6A0573-7C37-48B6-BA12-15BA3FD14A08}",
            "SPACINGSPECID": "{5277B5D7-33FE-4CB3-B622-4065B0896E2A}",
            "MEASUREDLENGTH": 0.43105229381131943,
            "MMELECTRICTRACEWEIGHT": 0,
            "SPECID": "{AB014786-52A7-4797-B8E5-ADEFFC2D0CCD}",
            "SUBTYPE": 1,
            "CONDUCTORSIZE": "4/0",
            "CONDUCTORMATERIAL": "ACSR",
            "PHASEDESIGNATION": 4,
            "FacilityId": "CONDB4DF2",
            "WORKFLOWSTATUS": null,
            "WORKFUNCTION": null,
            "WORKREQUESTID": null,
            "DESIGNID": null,
            "WORKLOCATIONID": null
        }
    }],
    "updates": [ ],
    "deletes": [ ]
}
```

The example JSON data packet shown above comprises a geometry portion that provides the geographic coordinates of end points of the conductor to be created as well as a set of attributes of the conductor. In some embodiments, the data packet can include an equipment identity (e.g., spec ID or equipment ID) which provides a reference to a model of an object, and encapsulates a set of attributes and engineering data associated with the object. For instance, in the example JSON data packet shown above, the SPECID "AB014786-52A7-4797-B8E5-ADEFFC2D0CCD" is associated with a specific model of a conductor. An application (e.g., application 120 in FIG. 1A) consuming the GIS data from the GIS 130 can use this SPECID included in the GIS data to look up supplementary information associated with the conductor. The supplementary information associated with an object can include attributes and engineering data such as impedance per unit length, reactance per unit length, maximum current carrying capacity, temperature tolerance for operation and/or other manufacturer data for the object. The supplementary information can be obtained from an equipment catalog (e.g., 135B in FIG. 1A) and/or other data stores. With the supplementary information readily available, the application can perform, in real time or near real time, advanced engineering analysis calculations on the network model that otherwise would have been too time consuming or not possible (e.g., because of lack of availability of some engineering data in the GIS data from the GIS 130).

In some embodiments, the disclosed system can perform one or more operations within the context of a transaction. For example, operations 1 and 2 can be performed together as part of a single transaction on the same reference network state to create a new immutable network state. If an operation that is a part of the transaction cannot be completed or would otherwise create an invalid state, the disclosed system prevents the entire transaction (i.e., operations 1 and 2) from being applied. By keeping the system looking at the existing state and not rolling forward to this new state that is invalid, the disclosed system prevents potential corruption of the design. From the view of the rest of the system it would appear that the commands of the transaction were never executed. This technique can be beneficial during import and network merge scenarios as it helps prevent the network design from reaching an invalid state.

In some embodiments, the disclosed system supports a branching structure in the sequence of commands that lead from one design state to another. This allows the disclosed system to model alternate variations of a given design project that diverge from some point in a shared command history. Each command in this arrangement refers to a single predecessor command and to one or more successor commands. A command that has more than one successor lies at a branching point in the tree structure of commands. From a branching point, two or more branches of command sequences diverge, each branch resulting in a distinct alternative design state that is a complete representation of the system. Consider the example of a design to upgrade electric service to several retail buildings in a commercial district. The design engineer begins by upgrading all of the transformers in place (command 1 and command 2) and then upgrading the secondary and service conductors that bring power from the transformers to the customers (command 3). The application of commands 1 through 3 results in a state labeled as "design alternative #1" which is illustrated in FIG. 3B. But now the engineer realizes that this project presents a unique opportunity to improve electrical performance (e.g., reduce power losses) for a small additional cost, by relocating some of the transformers that are being replaced. So the designer reverts the upgrade of secondary and service conductors by undoing command 3, and then moving three of the transformers via command 4. Command 4 is now a new, alternative successor of command 2. The designer upgrades the secondary and service conductors (command 5) which now requires new routing for some of the conductors (command 6). The foregoing activity results in a branch in the command history, which now has two independent command sequences that follow after command 2. The command sequence (1, 2, 3) leads to design alternative #1, while the command sequence (1, 2, 4, 5, 6) leads to design alternative #2, which is depicted in FIG. 3C. In introducing the new design alternative, the original alternative is not destroyed; the commands that lead to alternative #1 are preserved (e.g., stored in a data file such as data file 320) and can be replayed at any time in order to bring about the design state corresponding to alternative #1. Not entirely satisfied with alternatives #1 or #2, however, the engineer now reverts to the branching point by undoing commands 4, 5, and 6, and tries out a brand new alternative #3 by moving a different set of three transformers (command 7, which is a new alternative successor of command 2), and upgrading the secondary and service conductors (command 8) and rerouting some of them (command 9) as depicted in FIG. 3D. At this point, the disclosed system provides the design engineer the ability to switch between the three perfectly preserved design alternatives by navigating the branched command structure to move from state to state. This ability makes possible a side by side comparison of competing design ideas, each of which can be examined and evaluated as a complete state of the system and with the help of analysis and validation tools that work with the network model embodied by that state.

Figure 4:
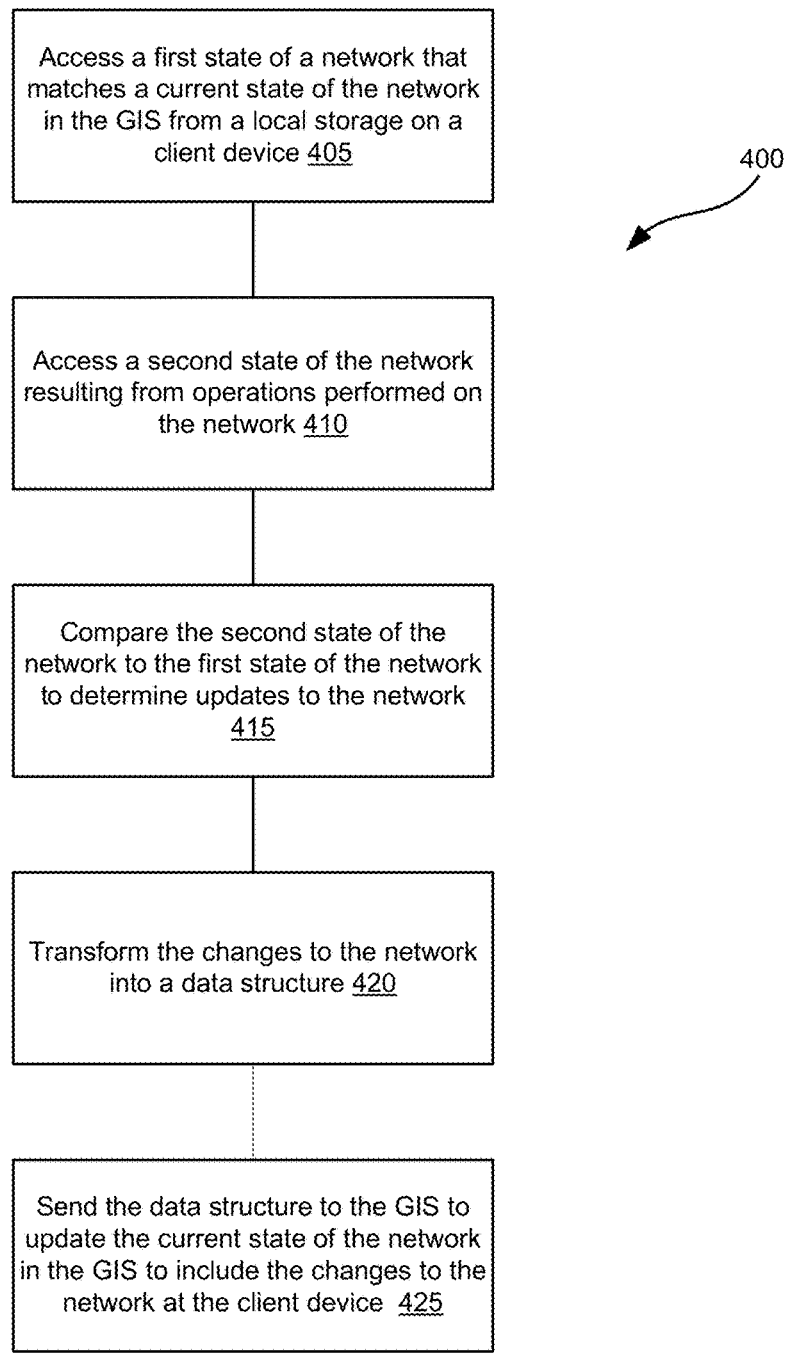
FIG. 4 is a logic flow diagram illustrating an example method of syncing network changes made to a network in a client device to the GIS in accordance with some embodiments of the disclosed system.

FIG. 4 is a logic flow diagram illustrating an example method of syncing network changes made to a network in a client device to the GIS in accordance with some embodiments of the disclosed system.

In some embodiments, the disclosed system accesses a first state of a network that matches a current state of the network in the GIS from a local storage on a client device at block 405. The disclosed system also accesses a second state of the network resulting from operations performed on the network at block 410. The operations can be captured as commands. The disclosed system then compares the second state of the network to the first state of the network to determine updates or changes to the network at block 415. In some embodiments, at block 420, the disclosed system transforms the updates into a data structure having a pre-defined schema. In some embodiments, the schema may be defined by or compatible with the GIS. The disclosed system then sends the updates in the form of data structure having the pre-defined schema to the GIS to update the current state of the network in the GIS to include the updates made to the network outside of the GIS in the design environment at the client device at block 425.

Figure 5:
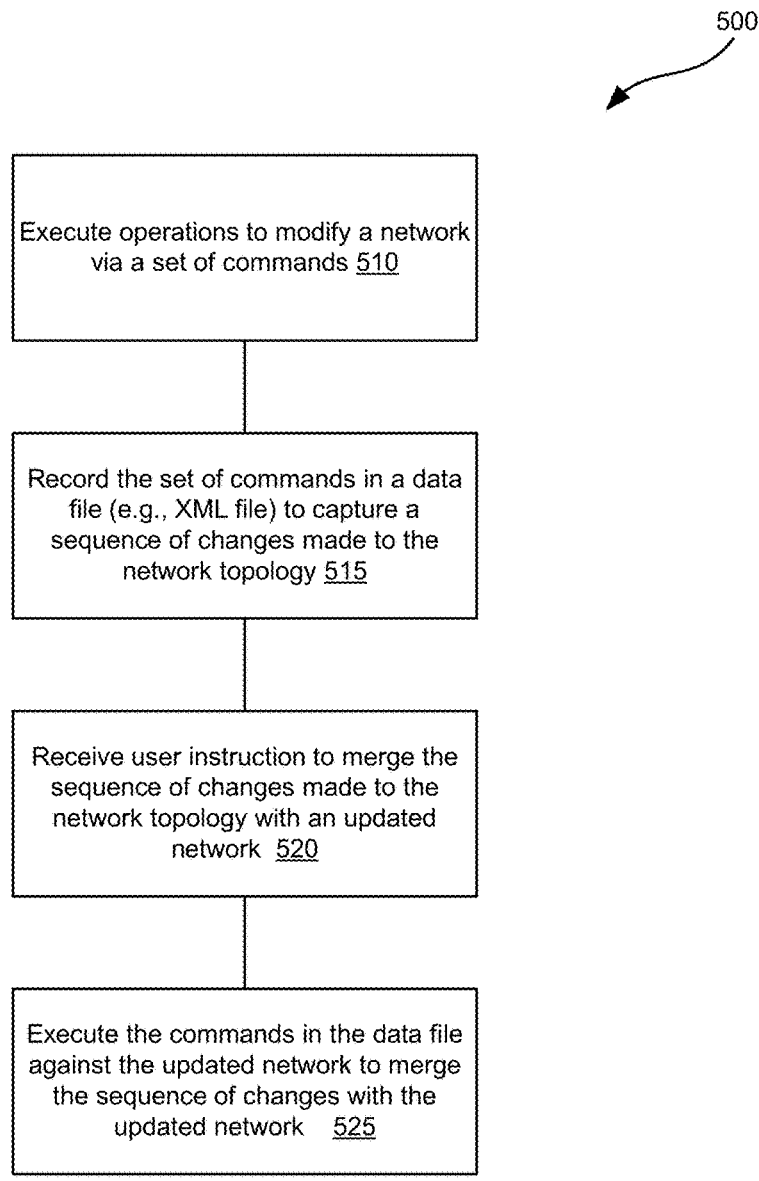
FIG. 5 is a logic flow diagram illustrating an example method of merging changes made to a network in accordance with some embodiments of the disclosed system.

FIG. 5 is a logic flow diagram illustrating an example method of merging changes made to a network at different points in time or at different sources in accordance with some embodiments of the disclosed system.

At block 510, the disclosed system performs operations to modify a network via a set of commands. One example of such an operation can be inserting a tap in an electric distribution network. This operation can be captured in terms of a command which expresses modification to the network topology, and does not include direct references. For example, the command can include information that a tap needs to be inserted on the first downstream port of the first component installed on the pole at a location near an office location. At block 515, the disclosed system records the set of commands in a data file to capture a sequence of changes made to the network topology. In some embodiments, the set of commands can be reduced by consolidating one or more commands into a single command. At block 520, the disclosed system receives a user instruction to merge the sequence of changes made to the network topology with an updated network. The updated network refers to the same network but including changes that were made elsewhere or at a different point in time. At block 525, the disclosed system executes the commands in the data file against the updated network to merge the sequence of changes expressed by the commands with the updated network. Since the commands describe the operations to be performed in terms of the network topology, when the commands are executed against the updated network many, if not all of the discrepancies in state with the original network can be overcome, resulting in fewer or no conflicts.

Figure 6:
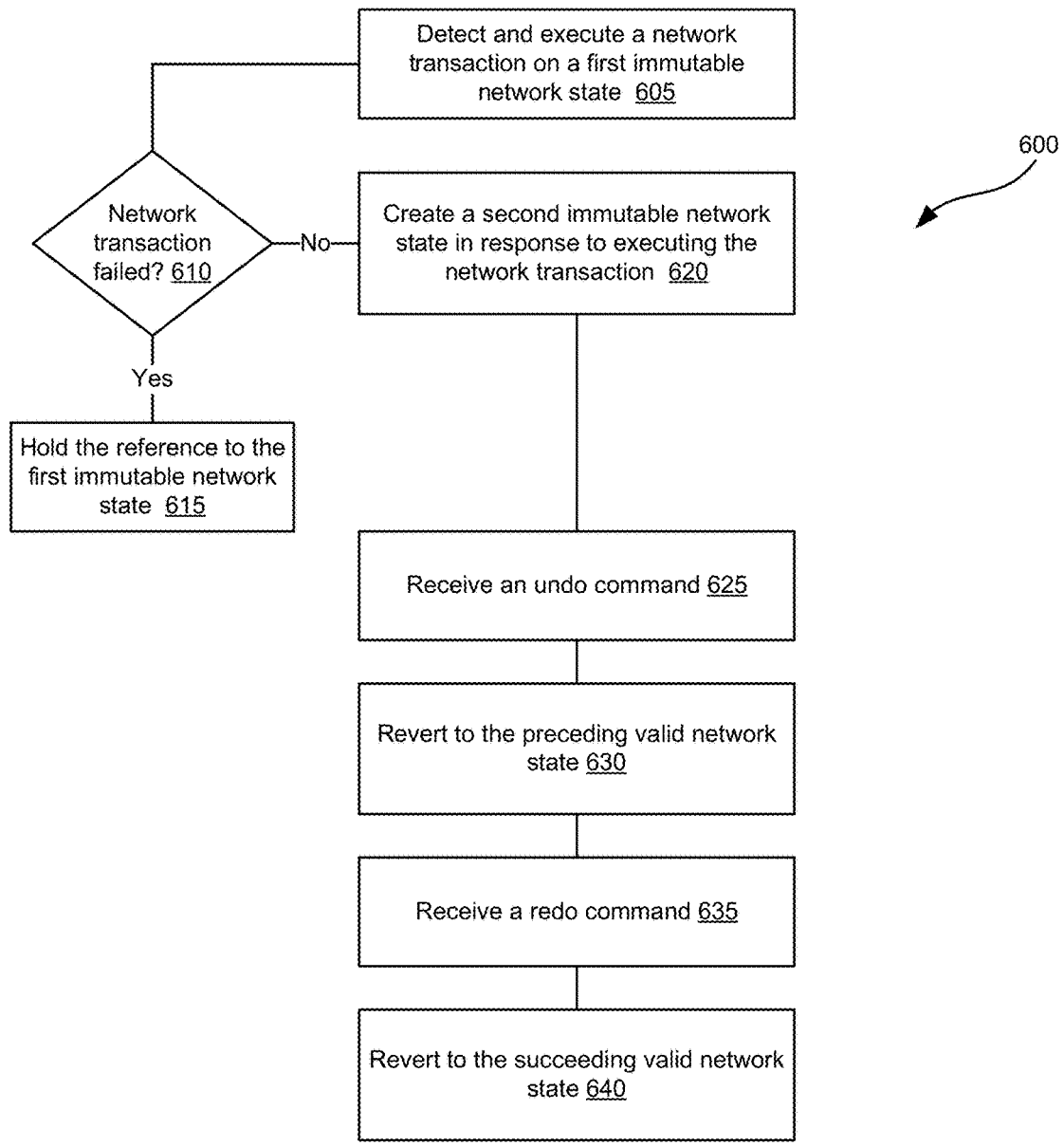
FIG. 6 is a logic flow diagram illustrating an example method of undoing or redoing changes made to a network in accordance with some embodiments of the disclosed system.

FIG. 6 is a logic flow diagram illustrating an example method of processing redo and undo commands on a network design in accordance with some embodiments of the disclosed system.

At block 605, the disclosed system detects and executes a network transaction on a first (immutable) network state. In some embodiments, a network transaction can be a change or a group of similar changes to a network initiated by a user. At block 610, the disclosed system determines whether the network transaction failed. A network transaction can fail if any one of the changes cannot be applied or causes an invalid network state to be created. If the network transaction failed, the disclosed system holds the reference to the first network state at block 615. In other words, no new network state is created. If, on the other hand, the network transaction was successfully executed, the disclosed system creates a second (immutable) network state in response to executing the network transaction at block 620. At block 625, the disclosed system receives an undo command. In response, the disclosed system reverts to the preceding valid network state at block 630. In this example, the disclosed system changes the reference from the second network state to the first network state such that if another network transaction were to be detected, the disclosed system would apply that network transaction to the first network state instead of the second network state.

At block 635, the disclosed system receives a redo command. In response to the redo command, the disclosed system reverts to a valid network state succeeding the current network state at block 640. In this example, the redo command would cause the current network state to change from the first network state to the second network state. In this manner, the disclosed system can go back and forth between network states in response to undo and redo commands.

Figure 7:
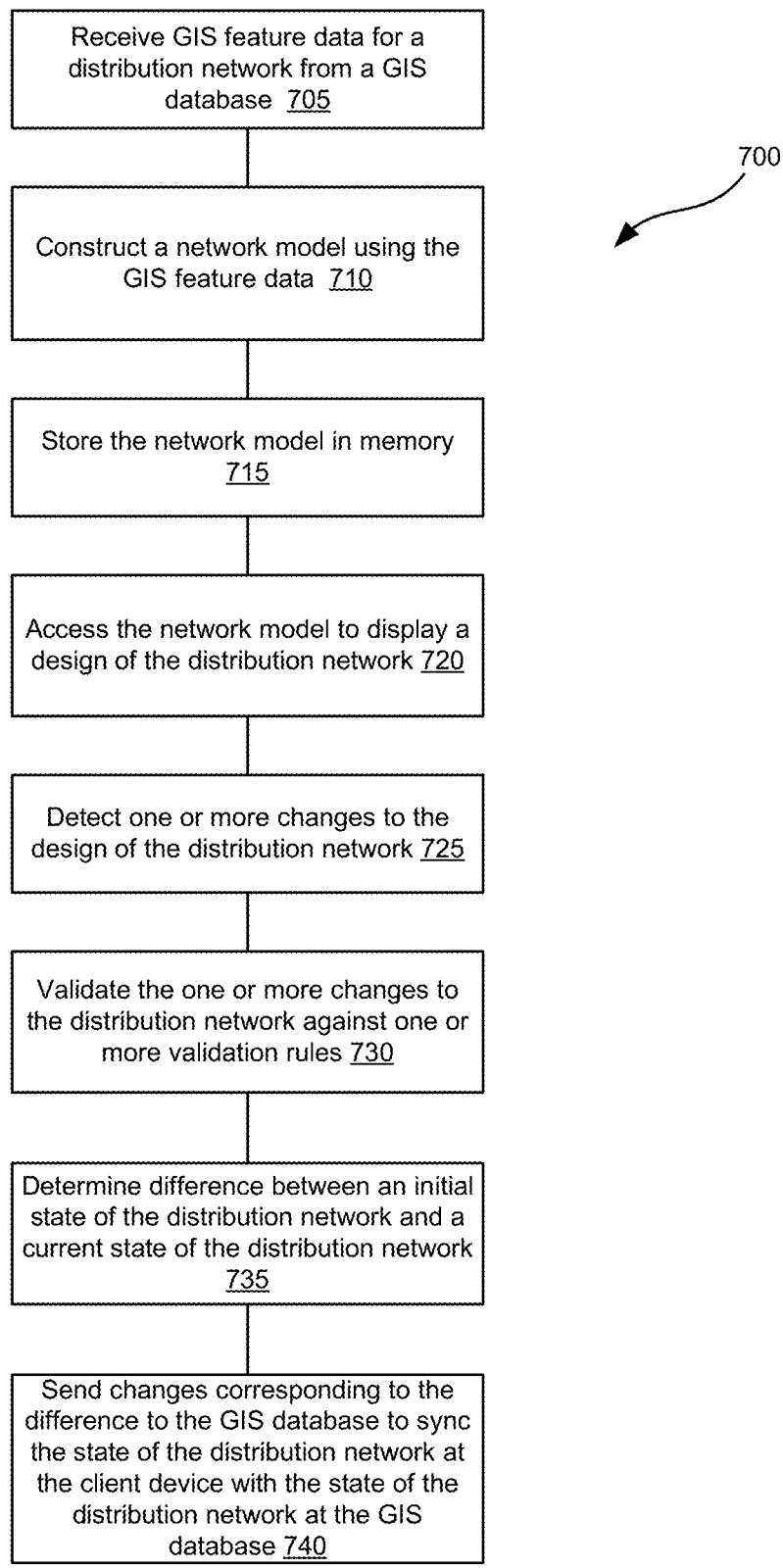
FIG. 7 is a logic flow diagram illustrating an example method of managing GIS data in a client environment in accordance with some embodiments of the disclosed system.

FIG. 7 is a logic flow diagram illustrating an example method of managing GIS data in a client environment in accordance with some embodiments of the disclosed system.

The method 700 includes the disclosed system, residing on a client device, receiving GIS feature data for a distribution network from a GIS database at block 705. The distribution network can be the whole network or a portion thereof (e.g., of a specific area of interest). The disclosed system (e.g., via distribution network modeling engine 215), at block 710, constructs a network model using the GIS feature data, and stores the network model in memory at block 715. At block 720, the disclosed system, via an application, accesses the network model to display a design of the distribution network. A user can make one or more changes to the design. At block 725, the disclosed system (e.g., via network configuration change detector 260) detects one or more changes to the design of the distribution network. The disclosed system (e.g., via validation engine 250) validates the one or more changes to the distribution network against one or more validation rules at block 730. At block 735, the disclosed system (e.g., via network sync and merge engine 275) determines difference between an initial state of the distribution network and a current state of the distribution network. The initiate state of the distribution network can be the last synced state of the distribution network (i.e., the current state of the distribution network in the GIS database). At block 740, the disclosed system (e.g., via network sync and merge engine 275) sends changes corresponding to the difference to the GIS database to synchronize the state of the distribution network at the client device with the state of the distribution network at the GIS database. In this manner, the GIS data from the GIS database can be manipulated and managed outside of the GIS to, among other things, provide improved performance and greater flexibility for performing various engineering analyses. Moreover, changes made outside of the GIS can be pushed back to the GIS database, periodically, on demand, or when connectivity is available, ensuring that the GIS database remains a central repository of GIS data.

Figure 8:
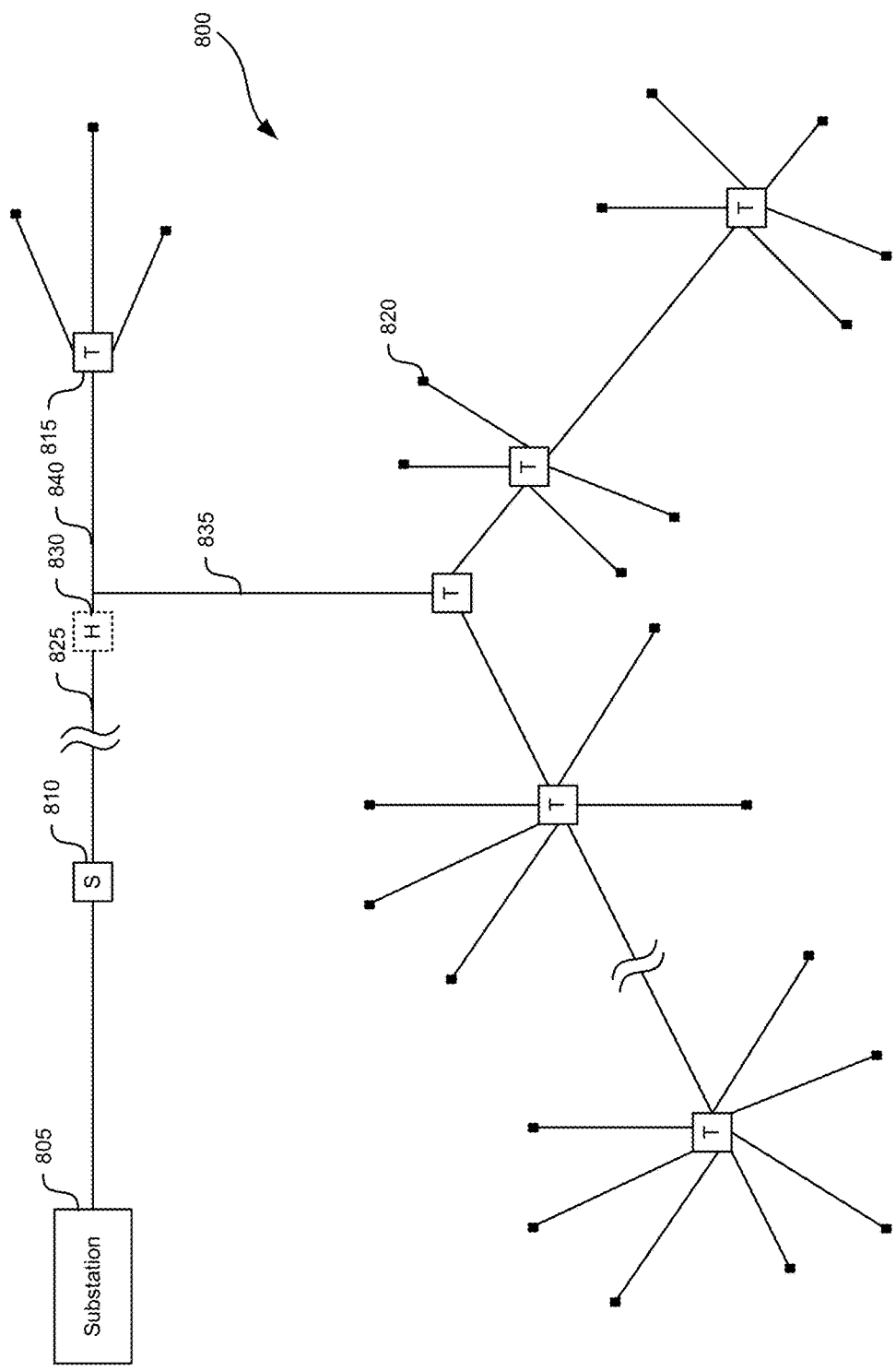
FIG. 8 is a schematic diagram illustrating a hypernode construct for facilitating efficient storage and transfer of network information.

FIG. 8 is a schematic diagram illustrating a hypernode construct for facilitating efficient storage and transfer of network information.

The distribution circuit 800 as illustrated depicts a portion of distribution circuit. For example, in addition to the substation 805, the switch 810, the transformers 815 and service points 820 depicted, the distribution circuit 800 can include additional branches, service points, transformers, switches, and/or other components. Suppose the area of interest for a user includes the branches 835 and 840. Typically, when extracting network information corresponding to an area (e.g., branches 835 and 840), the source of a feeder (i.e., substation 805) is needed to enable calculation of electric connectivity and/or other network analyses or calculations. For example, deriving additional feeder properties such as phase load balance needs information about the entire feeder which increases the size and memory footprint of the data to be extracted in order to take the network design offline for editing in a disconnected state. The disclosed system uses a hypernode construct to reduce the amount of network information to be extracted while including enough information about the feeder to enable any calculations. In the distribution circuit, the hypernode, which is an artificial node is depicted by reference number 830. As depicted, the hypernode 830 is inserted where a network edge is truncated by an extraction area (including branches 835 and 840) and stores upstream feeder information corresponding to the non-extracted area 825. The extraction area only needs to include network assets that may be modified or referenced as part of design work and the hypernodes can include relevant upstream information needed to derive properties such as energized feeder and phase load balance for the extracted network.

By utilizing the hypernode construct, the disclosed system eliminates the need to extract the area corresponding to branch 825 which significantly reduces the amount of network data. In other words, the hypernode construct reduces the size and memory footprint of the network design, which has the advantage of improving the performance of the design environment, and enabling rapid download and sharing of network designs between users and systems.

Figure 9:
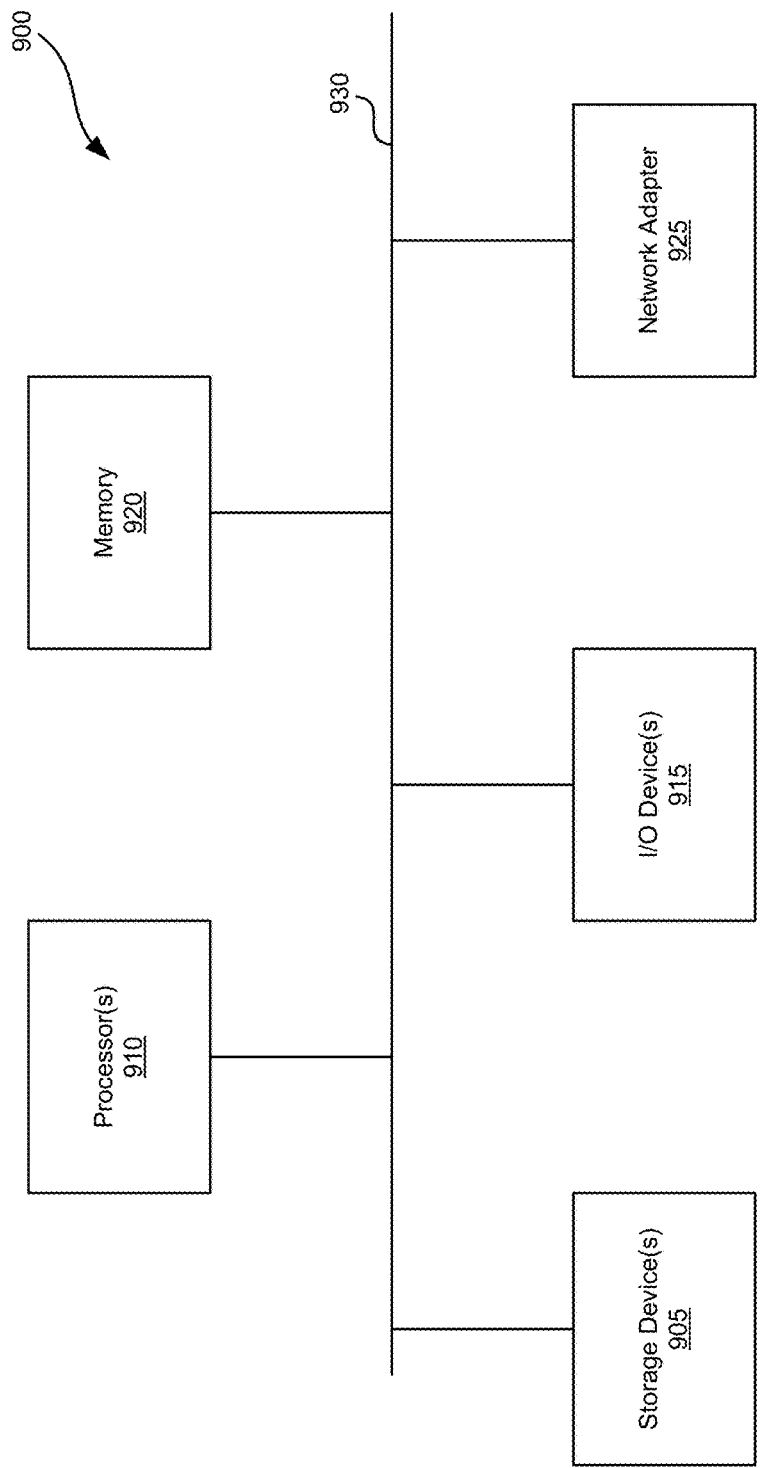
FIG. 9 is a block diagram of an exemplary apparatus that can perform various operations, and store various information generated and/or used by such operations in accordance with some embodiments of the disclosed system.

FIG. 9 is a block diagram of an exemplary apparatus that can perform various operations, and store various information generated and/or used by such operations in accordance with some embodiments of the disclosed technology.

The apparatus can represent any computer described herein. The computer 900 is intended to illustrate a hardware device on which any of the entities, components or methods depicted in the examples of FIGS. 1-8 (and any other components described in this specification) can be implemented, such as a server, client device 105, storage devices, databases (e.g., GIS database 130), network modeling engine 215, network analysis module 240, network configuration change detector 260, command builder 270, undo/redo module 276, hypernode builder 265, network sync and merge engine 275, rendering engine 250, and/or the like. The computer 900 includes one or more processors 910 and memory 920 coupled to an interconnect 930. The interconnect 930 is shown in FIG. 9 as an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the computer 900 and, thus, control the overall operation of the computer 900. In some embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 920 is or includes the main memory of the computer 900. The memory 920 represents any form of random access memory (RAM), read-only memory (ROM), flash memory, or the like, or a combination of such devices. In use, the memory 920 may store a code. In some embodiments, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 910 through the interconnect 930 are a network adapter 925, a storage device(s) 905 and I/O device(s) 915. The network adapter 925 provides the computer 900 with the ability to communicate with remote devices, over a network and may be, for example, an Ethernet adapter or Fibre Channel adapter. The network adapter 925 may also provide the computer 900 with the ability to communicate with other computers within a cluster. In some embodiments, the computer 900 may use more than one network adapter to deal with the communications within and outside of the cluster separately.

The I/O device(s) 915 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 920 can be implemented as software and/or firmware to program the processor(s) 910 to carry out actions described above. In certain embodiments, such software or firmware may be initially provided to the computer 900 by downloading it from a remote system through the computer 900 (e.g., via network adapter 925).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the technology introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 905 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The disclosed technology can also be adapted to other aspects of a utility distribution system such as the transmission/sub-transmission networks or the like.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the disclosed technology. Accordingly, the disclosed technology is not limited except as by the appended claims.

What is claimed is:

1. A method for synchronizing network changes relating to a distribution network to a Geographic Information System (GIS), comprising:

accessing, from a memory on a client device, an initial state of the distribution network,
        wherein the initial state of the distribution network on the client device represents a current state of the distribution network in the GIS, and is stored as a network model developed by transforming GIS data into the network model;
    accessing, from the memory on the client device, an updated state of the distribution network stored as a network model, wherein the updated state of the distribution network represents a state of the distribution network resulting from application of one or more commands to the network model for the initial state of the distribution network;

comparing by the client device the network model for the updated state of the distribution network to the network model for the initial state of the distribution network to determine distribution network changes for synchronization with the GIS; and sending the network changes including the one or more commands to the GIS over a communication network to update the current state of the distribution network in the GIS to a new state such that the new state captures the distribution network changes made outside of the GIS.

2. The method of claim 1, wherein the one or more commands capture one or more operations to change the distribution network, and wherein the one or more commands are captured in a serialized fashion in a JSON or XML file.

3. The method of claim 1, wherein the one or more commands originate from one or more user interactions with a design application executing on the client device.

4. The method of claim 1, wherein the distribution network is any one of: an electric distribution network, a gas distribution network, a water distribution network, or a telecom distribution network.

5. The method of claim 1, wherein the distribution network changes are captured in a data structure having a schema compatible with the GIS.

6. The method of claim 1, wherein one or more intermediate states are disposed between the initial and the updated states of the distribution network on the client device.

7. The method of claim 1, further comprising:
transforming a first state of the distribution network into a second state in response to application of a first sequence of commands including at least one command; and
storing the second state in the memory.

8. The method of claim 7, further comprising:
reverting to the first state of the distribution network from the second state by undoing the first sequence of commands; and
transforming the first state of the distribution network into a third state in response to application of a second sequence of commands including at least one command, the second sequence of commands being different from the first sequence of commands; and
storing the third state in the memory.

9. The method of claim 1, wherein the updated state of the distribution network is created by merging a first state of the distribution network with a second state.

10. The method of claim 9, wherein the merging further comprises:
capturing one or more operations performed to modify the first state as a first sequence of commands including at least one command; and
executing at least a subset of the first sequence of commands against the second state to create the updated state.

11. The method of claim 9, wherein the first and second states include network changes made to the distribution network at different points of time.

12. The method of claim 9, wherein the first and second states include network changes made to the distribution network at different sources.

13. A non-transitory machine-readable medium comprising instructions which when executed by a client device cause the client device to execute a method comprising:
accessing, from a memory on a client device, an initial state of the distribution network, wherein the initial state of the distribution network on the client device represents a current state of the distribution network in a GIS, and is stored as a network model developed by transforming GIS data into the network model;
accessing, from the memory on the client device, an updated state of the distribution network stored as a network model, wherein the updated state of the distribution network represents a state of the distribution network resulting from application of a sequence of commands to the network model for the initial state of the distribution network;
comparing by the client device the network model for the updated state of the distribution network to the network model for the initial state of the distribution network to determine distribution network changes for synchronization with the GIS; and
update the current state of the distribution network in the GIS to a new state using the sequence of commands such that the new state captures the distribution network changes made outside of the GIS.

14. The non-transitory machine-readable medium of claim 13, wherein the sequence of commands capturing the distribution network changes are stored in a data file using a structured format.

15. The non-transitory machine-readable medium of claim 13, further comprising storing one or more states of the distribution network between the initial state and the updated state in the memory to support transition from one state to another.

16. The non-transitory machine-readable medium of claim 13, further comprising responsive to a user request, undoing at least a subset of the one or more commands to revert from a current state of the distribution network in the memory to a prior state of the distribution network in the memory.

17. The non-transitory machine-readable medium of claim 13, further comprising responsive to a user request, redoing at least a subset of the one or more commands to advance from a current state of the distribution network in the memory to a subsequent state of the distribution network in the memory.

18. The non-transitory machine-readable medium of claim 13, wherein the distribution network is any one of: an electric distribution network, gas distribution network, telecommunication distribution network or a water distribution network.

19. A client device for synchronizing network changes relating to a distribution network from the client device to a Geographic Information System (GIS), comprising:
a memory; and
one or more processors which is configured to:
store in the memory an initial state of the distribution network, wherein the initial state of the distribution network on the client device represents a current state of the distribution network in the GIS, and is stored as a network model developed by transforming GIS data into the network model;
store in the memory an updated state of the distribution network as a network model, wherein the updated state of the distribution network represents a state of the distribution network resulting from application of one or more commands to the distribution network; and access the network models for the initial and updated states of the distribution network and compare the states to determine distribution network changes for synchronization with the GIS; and send the distribution network changes including the one or more commands to the GIS to synchronize the updated of the distribution network in the memory with the current state of the distribution network in the GIS.

* * * * *